INVENTORS.
DONALD R. STEWART
BY ELLIS D. KANE.

ATTORNEY.

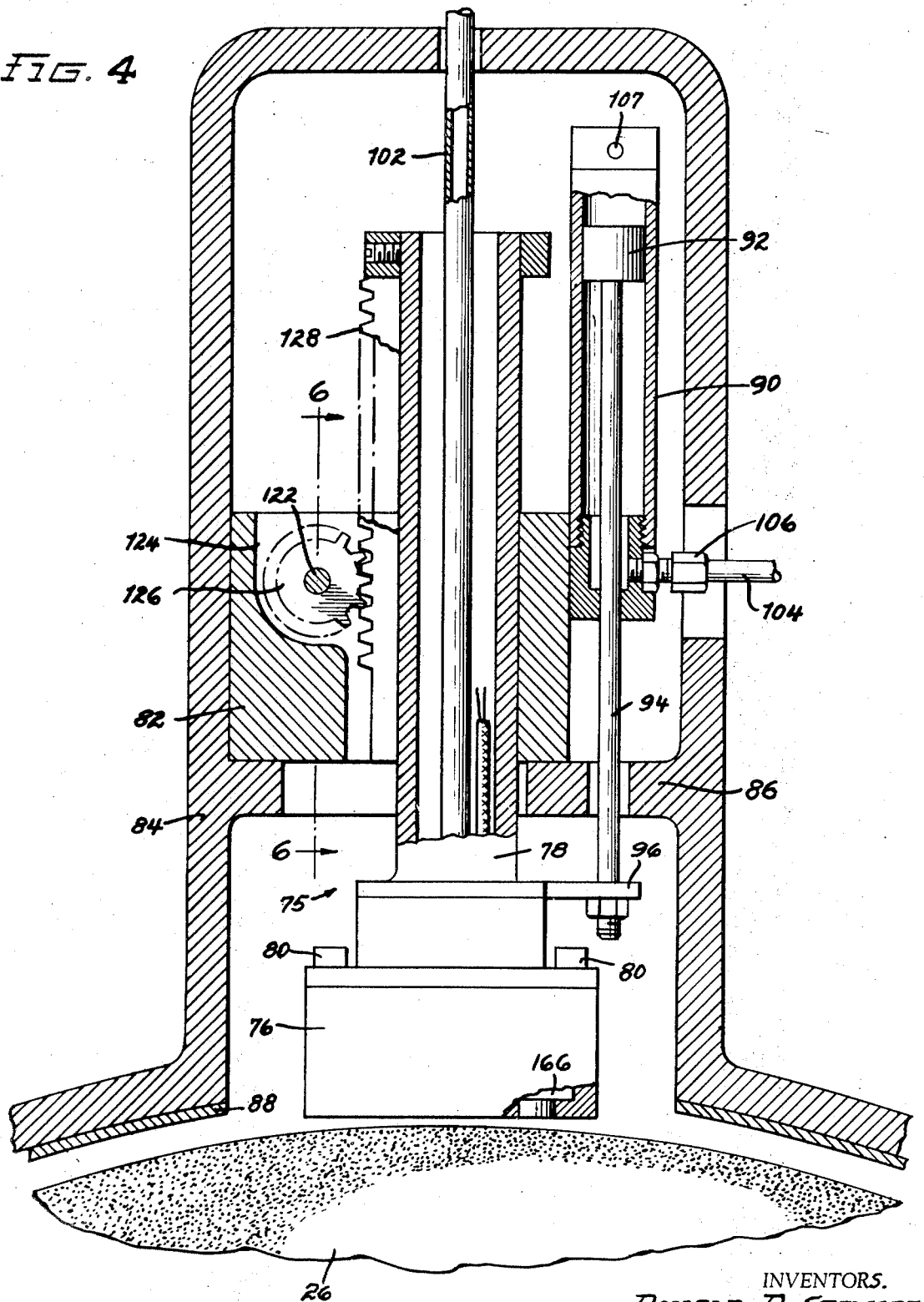

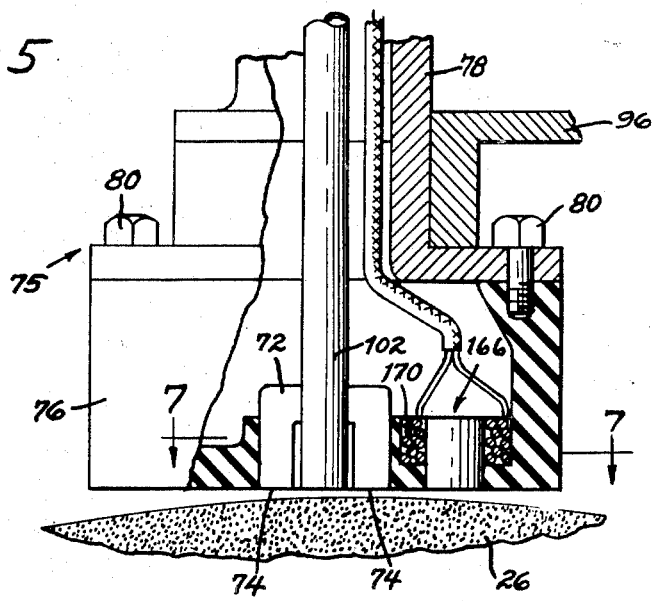
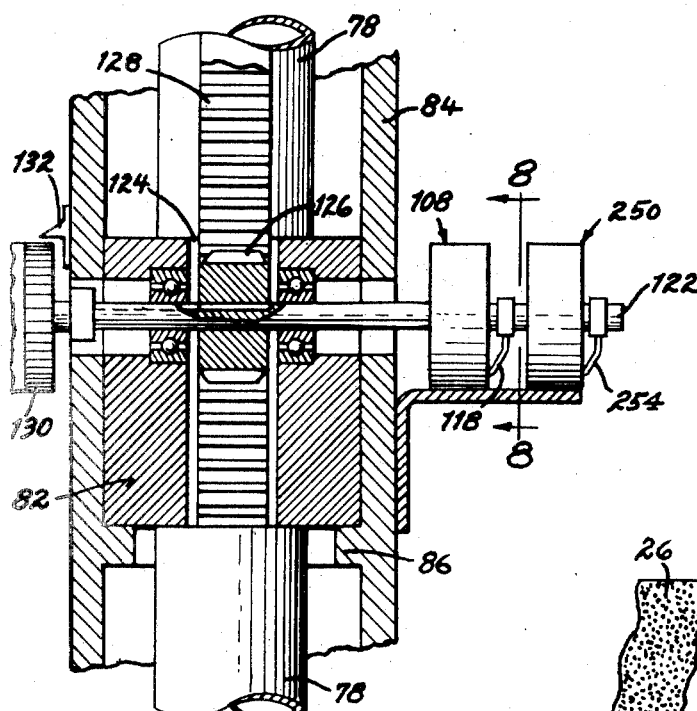
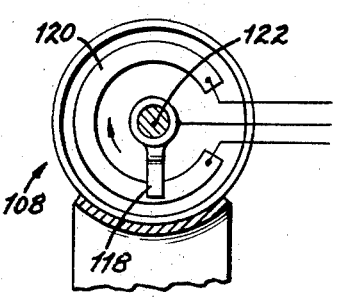
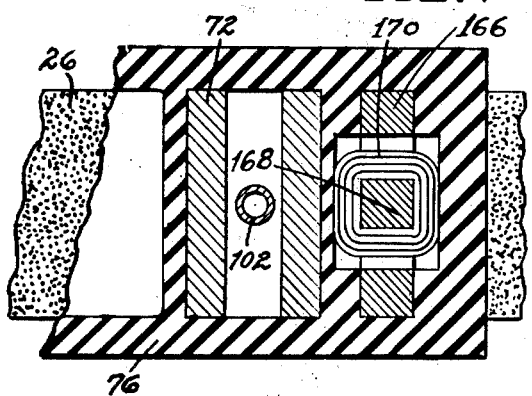
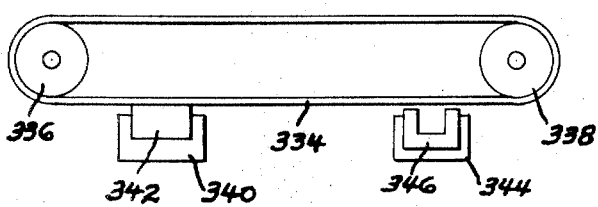

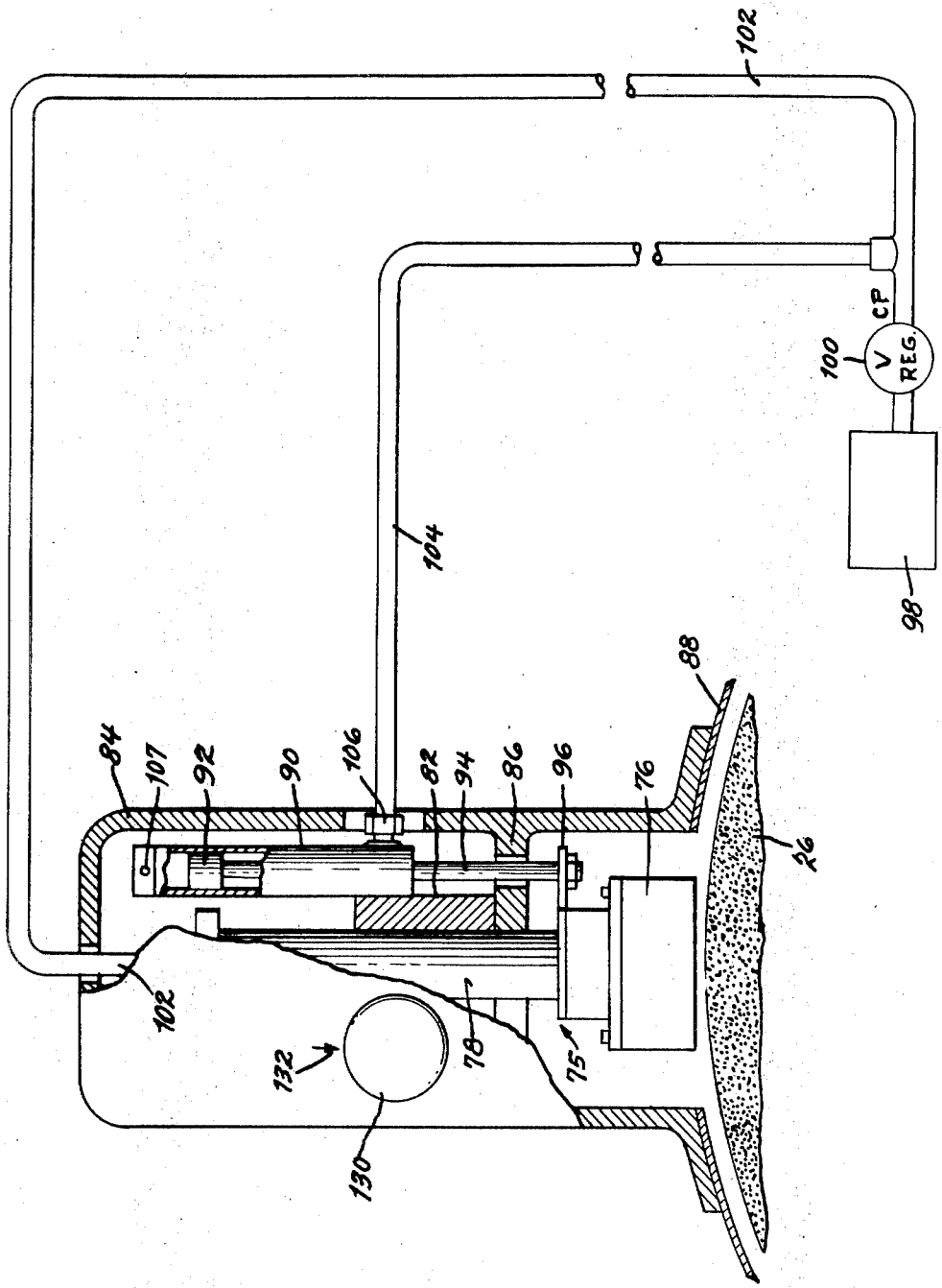

June 30, 1970  D. R. STEWART ET AL  3,517,460
ABRADING TOOL CONTROL SYSTEMS
Filed April 26, 1966  7 Sheets-Sheet 6
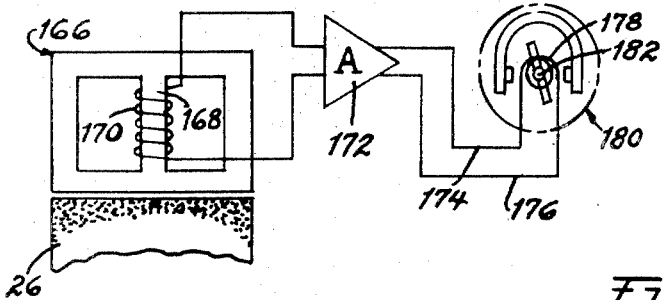
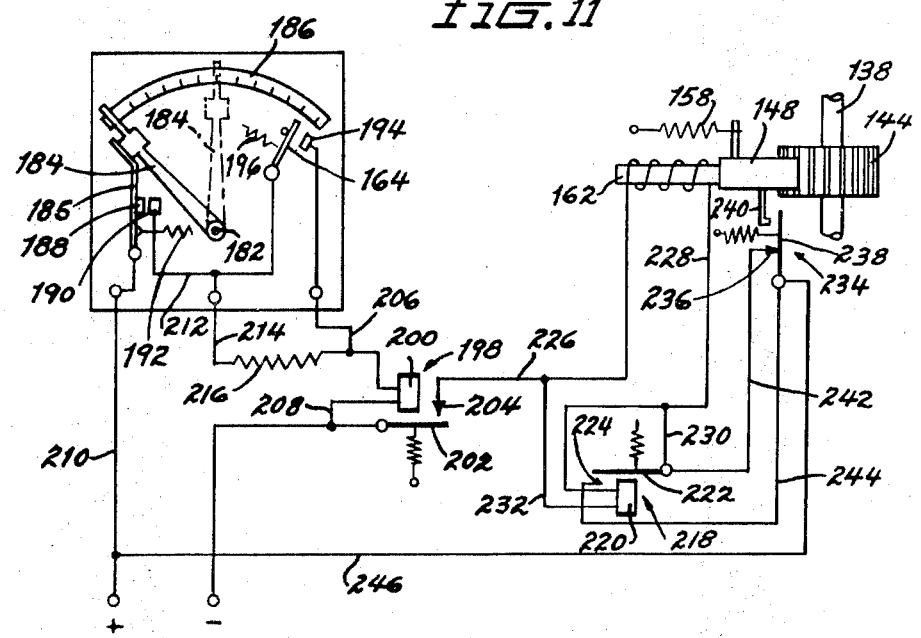
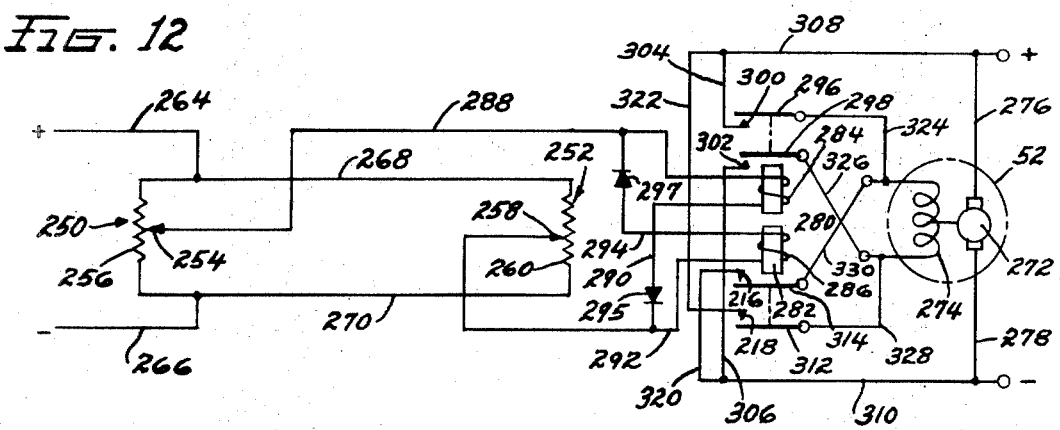
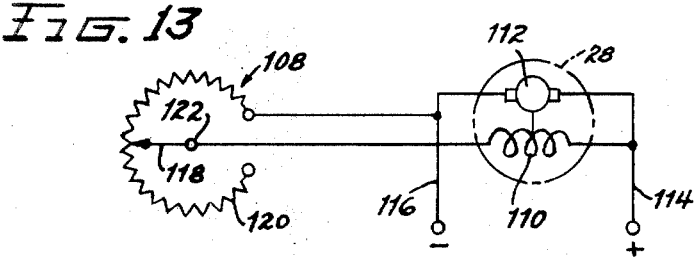
INVENTORS.
DONALD R. STEWART
ELLIS D. KANE.
By Wallace P. Lamb
ATTORNEY.

INVENTORS
DONALD R. STEWART
ELLIS D. KANE

By Wallace P. Lumb
ATTORNEY.

United States Patent Office 3,517,460
Patented June 30, 1970

3,517,460
ABRADING TOOL CONTROL SYSTEMS
Donald R. Stewart and Ellis D. Kane, Detroit, Mich.;
said Ellis assignor to Donald R. Stewart, Detroit, Mich.,
doing business as Stewart Instrument Company, Detroit,
Mich.
Filed Apr. 26, 1966, Ser. No. 545,363
Int. Cl. B24b 5/04, 53/14, 55/04
U.S. Cl. 51—5         14 Claims

ABSTRACT OF THE DISCLOSURE

The disclosure embraces a rotatable abrasive wheel for grinding metal parts to size and a magnet proximate the wheel grinding surface to remove loose metal particles from the wheel and to magnetize particles embedded in the wheel which accumulate and decrease grinding efficiency. The magnet is mounted for movement toward the wheel periphery to maintain the distance therebetween substantially constant and therefore the magnet is effective as the diameter of the wheel decreases by wear, the magnet being movable by a mounting which responds to the wear of the wheel. A transducer responds to a predetermined increase in the density of metal particles embedded in the wheel and generates a correspondingly increasing voltage and a control switch activated by a predetermined increased voltage causes a power element to move a dressing wheel to engage and dress the abrasive wheel to remove the objectionable metal particles.

SUMMARY OF THE INVENTION

The invention resides in the provision of mechanism for maintaining a magnet or a transducer or both at a substantially constant distance from a rotating abrasive wheel so as to remove the collection and build-up of metal particles on the wheel without appreciable loss of production time of the wheel.

This invention relates generally to abrading apparatus for grinding a metal workpiece.

As is well known in the brading or grinding wheel industry, an abrasive belt and/or a grinding wheel or other abrading tool used in grinding metal parts are soon embedded with metal particles which render them inefficient. When this occurred, in the past, it became necessary to shut down the machine and, in the case of a sanding machine, it was frequently necessary to replace the abrasive belt. In the case of a grinding wheel, embedded or loaded with metal particles, it has been the practice to stop the grinding of parts and apply a dressing tool to remove a sizeable amount of the wheel periphery in order to dislodge and remove the metal particles. In both cases, the objection has been loss of production and accompanying high costs of manufacture. Several proposed solutions to the problem have been proposed for removing the metal particles from abrading tools without discontinuing the grinding of parts or shutting down the machines. Among these proposals have been the use of high velocity jet streams directed at the embedded particles in an effort to dislodge them and the use of ultrasonic methods for cleaning grinding wheels. However, jet streams and ultrasonic methods have not appreciably decreased the "down" time of abrading tools.

Accordingly, it is the principal object of the invention to provide for effectively removing metal particles from an abrading tool while it is in use so as to appreciably reduce grinding operation cost.

Another object of the invention resides in the provision of a magnet positioned in close proximity to the abrading surface of an operating abrading tool so as to effectively attract and remove metal particles therefrom to prolong the effectiveness of the tool.

Another object of the invention is to provide for the removal of metal particles from an abrading tool during the abrading operation.

Another object of the invention is to provide for a grinding wheel, a magnet for removing loose metal particles from the wheel periphery and to maintain the magnet a substantially constant optimum magnetically attractive distance from the wheel periphery irrespective of decrease in wheel diameter by wear.

Another object of the invention is to provide for grinding apparatus having a grinding wheel and a normally inactive dressing wheel, a control system in which a magnet is positioned to attract metal particles from the wheel, and magnetize those particles which become embedded in the wheel, and to control activation of the dresser wheel in response to a predetermined increase in the magnetic field of the embedded particles.

Another object of the invention is to provide for an abrasive wheel grinding machine in which metal particles become embedded in the wheel periphery with accompanying decrease in efficiency of the grinding operation, an indicator responsive to increase in the density of metal particles in the wheel periphery to indicate to a machine attendant the need for a wheel dressing operation.

In connection with the next preceding object, it is another object of the invention to provide for automatically activating a wheel dressing tool in response to a predetermined increase in the density of metal particles in the wheel periphery indicative of a need for dressing the wheel.

Another object of the invention is to provide a control system operable automatically to discontinue the dressing operation of the wheel in response to a predetermined decrease in the density of metal particles in the wheel periphery.

Another object of the invention is to provide for a grinding machine having a grinding wheel which is moved against a workpiece, a control system for controlling movement of the wheel against the workpiece to effect a desired workpiece size irrespective of decrease in the diameter of the grinding wheel by wear both of the wheel and the workpiece.

In connection with the next preceding object, it is a specific object of the invention to provide a settable stop member which has a preliminary setting to stop advance of the wheel with respect to controlling size of the workpiece and automatically resetting the stop member in response to wear of the wheel.

Another object of the invention is to automatically control the workpiece size in resonse both to advance of the wheel to the workpiece and to decrease in the diameter of the wheel.

Other objects of the invention will become apparent from the following description, taken in connection with the accompanying drawing in which:

FIG. 4 is an enlarged fragmentary sectional view; taken along the line 4—4 of FIG. 1;

FIG. 5 is an enlarged fragmentary side view, partly broken away and in section;

FIG. 6 is a vertical sectional view, taken along the line 6—6 of FIG. 4;

FIG. 7 is a horizontal sectional view, taken along the line 7—7 of FIG. 5;

FIG. 8 is a vertical sectional view partly in elevation, taken along the line 8—8 of FIG. 6;

FIG. 9 is a view partly broken and in section and partly diagrammatic of a control system;

FIG. 10 is a diagrammatic illustration of an electrical control system for a volt meter;

FIG. 11 is a diagrammatic illustration of an electrical control system for activating a dressing wheel;

FIG. 12 is a diagrammatic illustration of an electrical control system for controlling operation of a part size control feed motor;

FIG. 13 is a diagrammatic illustration of a control system for a grinding wheel driving motor, and FIG. 14 is a plan view of another type of abrading machine embodying our invention.

Figure 1:
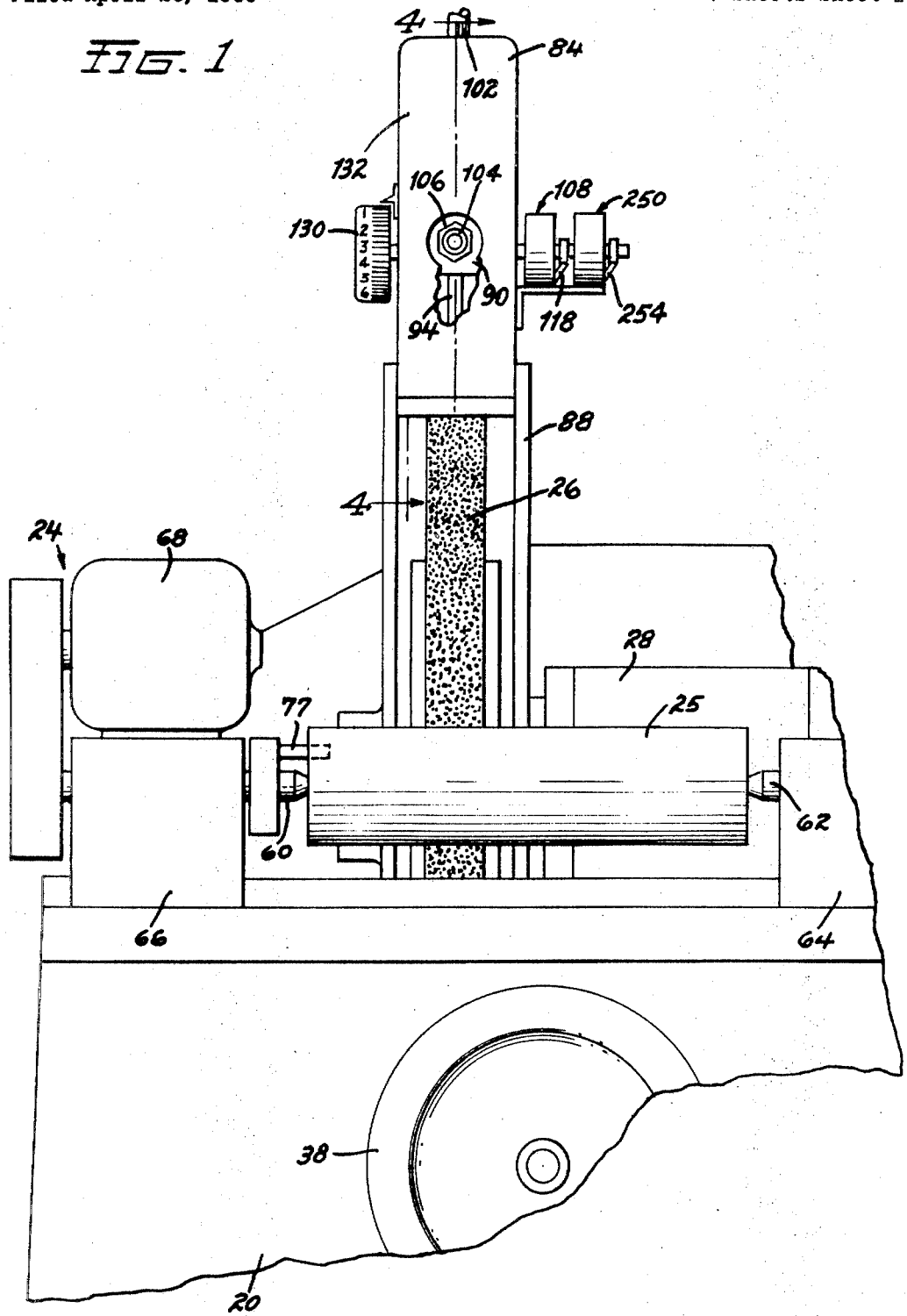
FIG. 1 is a front view partly broken away of an abrading or grinding apparatus embodying features of my invention.

Referring to the drawings by characters of reference, the abrading or grinding machine shown comprises, in general, a base 20, a movable table 22, a workpiece drive mechanism 24, and an abrading tool or grinding wheel 26. The workpiece drive mechanism 24 is mounted on the base 20 at the front of the machine and the grinding wheel 26 is mounted on the table 22 for movement toward a metal workpiece 25, mounted for rotation about a horizontal axis. Also mounted on the table 22 there is an electric motor 28 for rotatably driving the grinding wheel 26 through a suitable drive connection, such as a belt drive.

Figure 2:
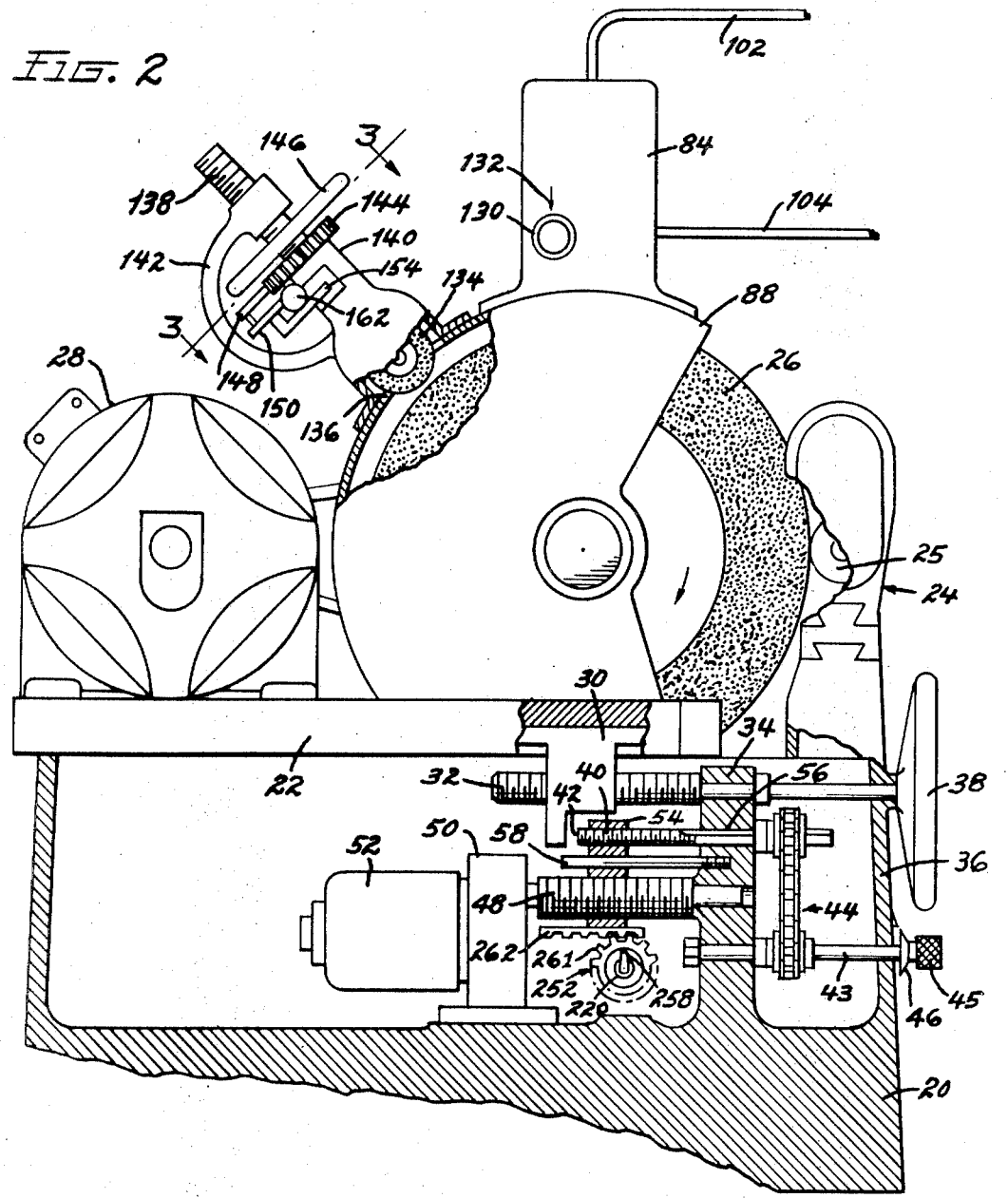
FIG. 2 is a side view partly broken away and in section.

The table 22 is slidably supported and guided on the top of the base 20 and has secured to the underside thereof a depending lug 30 which is internally threaded to receive a feed means or screw 32 for moving the grinding wheel 26 to the workpiece 25. As shown in FIG. 2, the feed screw 32 is journaled for rotation in an upstanding abutment 34 of the base 20 and in front wall 36 of the base, the shaft of the feed screw 32 has a hand wheel 38 affixed thereto. It will be understood by those skilled in the art that the grinding wheel 26 could be fed against the workpiece by any other suitable feed means and may be driven by the conventional hydraulic system, or by any other suitable means. Below and parallel with the feed screw 32 there is a settable stop member 40 in the form of a screw, one end 42 of which is positioned in the path of the lug 30. The settable stop screw 40 may be set by a machine operator to stop the advance of the grinding wheel 26 when the workpiece 25 has been ground to the desired size. A rotatable shaft 43, parallel with the settable stop screw 40, is journaled for rotation in the base 20 and is connected to the stop screw by a gear and chain drive connection, designated generally by the reference character 44. Projecting forwardly of the base 20, an end portion of the shaft 43 has a hand knob 45 affixed thereto to rotate the shaft for setting the stop screw at the desired position. A dial 46, on the shaft 43 may be suitably calibrated to indicate the position of the settable stop screw 40. Further, the settable stop screw 40 is resettable by another feed means or screw 48 which is below and parallel to the stop screw 40. At one end thereof, the screw 48 has a shank journaled in the abutment 34 and at the other end has a similar shank journaled within a housing 50 of a speed reduction mechanism for a reversible electric drive motor 52. Threaded onto the screw 48 there is a traveler or nut 54 into which the settable stop screw 40 is also threaded. The settable stop screw 40 is movable axially thereof with the nut 54 by and when the motor 52 is energized, the purpose being to reset the stop screw to compensate for decrease in diameter of the grinding wheel 26 as the wheel wears. In order that the settable stop screw 40 may be moved axially by the feed screw 48, the stop screw is provided with a keyway 56 to receive a key (not shown) on the upper gear of the gear and chain drive connection 44. The numeral 58 designates a stationary guide rod along which the nut 54 slides.

With reference to FIG. 1, the metal workpiece 25 is shown as being of cylindrical configuration and held by its ends between a pair of rotatable center pins 60 and 62, rotatably journaled in a mounting block 64 and within a housing 66 of a speed reduction mechanism which is not shown, but may be any of the suitable well known mechanisms. An electric motor 68 drives the speed reduction mechanism and thus rotatably drives the metal workpiece 25 through the well known drive pin, as at 77.

As previously mentioned, in the grinding of a metal workpiece by an abrading tool such as the grinding wheel 26, many of the metal particles ground from the workpiece cling to the wheel periphery and through continued grinding are ironed or embedded into the wheel which reduces cutting efficiency and requires frequent dressing of the wheel. In accordance with one feature of our invention, we improve the efficiency of operation of abrading tools with accompanying decrease in the frequency of wheel dressing operation by providing a magnet 72 as shown in FIG 5, and positioning the magnet with its poles 74 proximate the periphery of the grinding wheel 26 to attract and remove loose metal particles therefrom before they are embedded into the wheel. The magnet 72 is preferably a permanent magnet of U-shaped configuration and may be mounted directly above the axis of rotation of the grinding wheel 26. As shown in FIG. 7, the legs of the magnet 72 extend across, at least, the full width of the grinding wheel 26. In addition to extracting loose metal particles from the grinding wheel 26, the magnet 72 magnetizes those metal particles which have been ironed into the wheel. As will be hereinafter fully understood, the intensity of the magnetic field increases as the surface area of metal particles on the wheel increases.

The poles 74 of the magnet 72 should be positioned as close as possible to the periphery of the grinding wheel 26, without danger of being struck thereby, so as to obtain the optimum magnetic force for attracting loose metal particles from the wheel periphery and to effectively magnetize those particles which become ironed into the wheel 26 by the grinding operation. In this connection, another feature of the invention is to maintain the above mentioned desired distance between the magnet poles 74 and the grinding wheel periphery substantially constant irrespective of wheel wear and accompanying decrease in the wheel diameter. To this end, the magnet 72 is mounted on and is a part of a vertically movable head 75 including a lower head member 76, and a vertical tube 78. The head member 76 is rigidly secured to the lower flanged end of the tube 78, such as by screws 80, and the tube 78 extends upwardly through and is guided by a body 82 within a housing 84. The body 82 is supported on a cross web 86 of the housing 84 and is secured to and within the housing, as shown in FIG. 4, the housing being rigidly mounted on a safety guard member 88 which extends partially around the periphery of the grinding wheel in the conventional manner.

Mounted on and rigidly secured to the body 82 there is a cylinder 90 of a fluid pressure system, the cylinder containing a vertically movable pressure responsive control member or piston 92 having a connecting rod 94 which is connected at its lower end to a laterally extending arm 96 of the tube 78. With reference to FIG. 9, the fluid pressure system utilizes compressed air and includes a compressor 98, connected to the outlet of which there is a constant pressure outlet valve 100, and connected to the outlet of the valve is one end of a fluid conducting tube 102. The tube 102 extends from the valve 100 down through the top of the housing 84, through the larger tube 78 and the web of the magnet 72 to the bottom of the head member 76 where the discharge end or nozzle of the tube 102 directs a stream of pressurized fluid against the periphery of the grinding wheel 26. The tube 102 is affixed to the head 75 for vertical movement therewith and the tube 102 may be flexible to permit such movement. A branch tube 104, connected to and in communication with the tube 102 has an outlet end connected by a fitting 106 to an inlet to the cylinder 90 below the piston 92. The air pressure may be regulated at the constant pressure outlet valve 100 so as to counterbalance the weight of the head and thus maintain the poles 74 of the magnet 72 at a predetermined substantially constant distance from the periphery of the grinding wheel 26 irrespective of decrease in the diameter of said wheel. As the diameter of the wheel 26 decreases, due to wear, the pressure of the fluid in the pressure fluid system tends to decrease correspondingly thus causing an unbalanced condition bewteen the weight of the head and the counterbalancing fluid pressure. However, such unbalance of the forces allows the head to move down unitl the forces are again in balance whereupon the magnet 72 is at the desired distance from the periphery of the wheel. It will be understood that the fluid pressure in the pressure fluid system is regulated such that the force of the fluid stream directed at the wheel periphery will maintain a back pressure on the piston 92 to hold the magnet poles 74 as a desired distance from the wheel periphery. Accordingly, as the wheel periphery recedes with wear, the back pressure exerted by the stream of fluid acting against the wheel periphery decreases as the distance between the magnet poles 74 and receding wheel periphery increases. Thus, the wheel periphery functions as a valve for the outlet or nozzle of the tube 102 and the stream of fluid acting against the wheel periphery is a sensor whereby the piston 92 responds to decrease in the wheel diameter. Basically, the invention resides in the provision of a counterbalance which counterbalances the weight of the magnet and the magnet head in response to a decrease in the diameter of the grinding wheel. It will be noted that decrease in back pressure from the nozzle effects a corresponding decrease in the volume of the pressure system which allows corresponding downward movement of the head, since the regulated pressure remains constant. It will be apparent to those skilled in the art that other types of counterbalances may be used, such as a mechanical counterbalance in which an inclined plane, which moves horizontally with a grinding wheel table, supports a magnet head to allow descent of the latter as the table is moved to compensate for wheel and workpiece wear, thus maintaining the magnet poles a constant distance from the wheel periphery. Further, the maintenance of a substantially constant distance between the magnet poles and the wheel periphery could be achieved by supporting the magnet head with an electrically operable pawl and ratchet wheel under the control of a switch member responsive by a photocell to a decrease in the diameter of a grinding wheel. Thus, as wear of the wheel 26 occurs, the magnet 72 is constantly moving down to maintain the distance between its poles and the periphery of the wheel at a substantially constant distance for optimum magnetic effectiveness of the magnet on loose metal particles on the wheel. Any suitable fluid may be used in the fluid pressure system, such as air, or if desired a liquid such as the well known liquid coolants may be used. As shown in FIG. 4, the compressed air system has the usual air bleed 107 in communication with the upper end of the cylinder 90.

The head member 76 also functions as a second safety guard member to protect the machine operator against injury by flying particles of the workpiece or wheel, the member 76 always being in close proximity to the periphery of the wheel to block any foreign debris.

As is well known, the surface speed of the grinding wheel 26 should remain constant for best grinding results, but will decrease in proportion to the decrease in the wheel diameter as wear occurs and to overcome this objection we provide a rheostat 108, for the grinding wheel driving motor 28 and operate the rheostat by the downward movement of the head 75 which movement is a function of the rate of decrease of the wheel diameter. The motor 28 is diagrammatically illustrated in FIG. 13 as comprising a field coil 110 and an armature 112, the latter being connected by leads 114 and 116 to a suitable source of electric power. Connected in series across the leads 114 and 116 is the field coil 110, a rotary contact element or arm 118 and a resistor 120 of the rheostat 108.

The rheostat contact member 118 is affixed to a rotatable shaft 122 which, as shown in FIG. 6, extends through the housing 84 and is journaled in the body 82. A vertical clearance opening 124 in the body 82 receives a pinion 126 which meshes with a vertical gear rack 128, rigidly secured to the outer face of the vertically movable tube 78. Thus, the downward movement of the head 75, which is a function of the decrease in diameter of the grinding wheel 26, rotates the rheostat contact arm 118 to increase the speed of motor 28, thereby to maintain the surface speed of the grinding wheel 26 substantially constant irrespective of the decreasing diameter of the grinding wheel. Affixed onto the shaft 122 on the other side of the housing 84 from the rheostat 108 there is a dial indicator 130 which may be calibrated to indicate, with reference to a fixed mark 132, the diameter of the grinding wheel 26.

Figure 3:
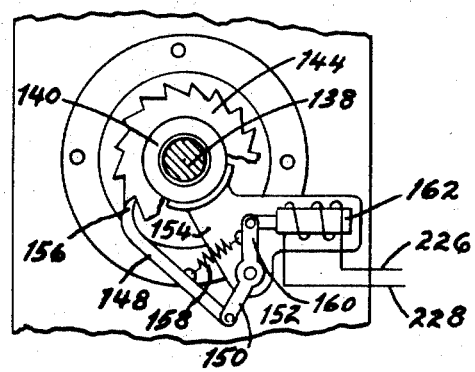
FIG. 3 is a sectional view, partly in elevation, taken along the line 3—3 of FIG. 2.

As previously mentioned, the magnet 72 removes loose metal particles from the wheel 26 to appreciably increase the efficiency of a grinding machine, but the magnet does not remove all of the metal particles so that eventually the wheel periphery area would be embedded with metal to a degree that would impair the abrasive efficiency of the wheel. Accordingly we provide as another feature of our invention, a dressing tool 134 which is movable into cutting engagement with the periphery of the wheel 26 automatically in response to a predetermined decrease in wheel efficiency based on the percentage of the wheel periphery area covered by metal particles. Specifically, the dressing tool 134 is mounted in a clearance opening 136 in the guard member 88 and is carried by one end of a worm gear 138. An internally threaded tubular member 140 receives the worm gear 138 in mesh therewith and is rigidly mounted on one end thereof to the guard member 88 over the clearance opening 136, as shown in FIG. 2. The tubular member 140 is constructed in two axially aligned sections connected rigidly by a web 142 and between the opposed ends of said sections there is a ratchet wheel 144, affixed onto the worm gear 138. Also, a manually operable wheel 146 may be affixed onto the worm gear 138, between the opposed ends of the tubular sections for manually adjusting the position of the dressing tool 136. A pawl 148, as shown in FIG. 3, is pivotally connected to an arm 150 of a lever which in turn is pivoted, as at 152, on a bracket 154, mounted on the side of the tubular member 140. An abutting end 156 of the pawl 148 is urged into engagement with a tooth of the ratchet wheel 144 by a coil spring 158. Another arm 160 of the pawl operating lever is connected to a power element or solenoid 162 which, when energized, will operate the pawl 148 and rotate the ratchet wheel 144 whereby to advance the dressing tool 134 to the periphery of the grinding wheel 26.

The operation of the solenoid 162 to engage the dressing tool 134 with the wheel 26 is controlled by a control member or switch 164, shown in FIG. 11, and the switch 164 is responsive to a predetermined increase in the amount or density of metal particles embedded in the periphery of the wheel 26 as sensed by magnetic transducer 166 mounted in the lower end of the head member 76, as shown in FIGS. 5 and 7. The transducer 166 is formed to effectively sense the metal content of the wheel periphery across its entire width and as diagrammatically ilustrated in FIG. 10, may comprise a core 168 and a coil 170, the latter being connected by leads to an amplifier 172. From the output of the amplifier 172, leads 174 and 176 connect to opposite ends of a coil 178 of a millivoltmeter 180 having a rotor affixed to a rotatable shaft 182. As illustrated in FIG. 11, a pointer or rotatable arm 184 is affixed to the shaft 182 to traverse a voltage scale 186, and is rotatable from its zero voltage position, shown in full lines, across the scale as the density of metal particles embedded in the wheel periphery increases. In its "0" voltage or starting position, the arm 184 holds a switch member 185 in open position, the switch member carrying a contact member 188 biased to engage a fixed contact member 190 by a coil spring 192. Near the other end of the voltage scale 186 is the switch member 164 cooperable with a fixed contact member 194 to activate the solenoid 162, the switch member 164 being biased to open position by a spring 196 and being pivoted by the arm 184 to engage contact 194 when the meter driven arm 184 reaches a predetermined position representative of an undesirable increase in the density of metal particles embedded in the wheel 26. Thus the switch member 164 is an indicator of the condition of the grinding wheel and also as a control member to control activation of the dressing wheel 134.

In addition to the above described meter-operated switches and the solenoid 162, the control system includes a normally open control relay 198 comprising the usual coil 200, a movable contact member 202, and a fixed contact member 204. One end of the relay coil 200 is connected by a lead line 206 to the meter switch contact member 194 and the other end of the coil is connected by a lead line 208 to the negative terminal of the voltage source as is also the movable relay contact 202. The movable contact member of the switch 185 is connected by a lead line 210 to the positive terminal of the source of power and the contact member 190 is connected by a lead line 212 to the movable contact member 164. Thus, it will be seen that when both of the meter operated switches are closed, the relay coil 200 will be energized to close the relay contacts 202 and 204. A lead line 214 connects the switch contact 190 to lead 206 and thus to the relay coil 200, and in the lead line 214 there is a resistor 216. It will thus be understood that when the arm 184, moving toward the high voltage end of the scale 186, allows switch 185 to close, the relay coil 200 is energized to effect an electromotive force, determined by resistor 216, insufficient to close the relay switch member 164, but sufficient to hold it closed.

The control system for controlling operation of the dressing tool 134 further includes a normally open time delay relay 218 having the usual coil 220, movable contact member 222 and fixed contact member 224. A lead line 226 connects the fixed contact member 204 of the control relay 198 to one end of the coil of solenoid 162, the other end of the coil being connected by a lead line 228 to one end of the relay coil 220 and by a lead 230 to the relay movable contact member 222. The other end of the relay coil 220 is connected to the fixed contact member 204 by a lead line 232.

Further, the control system for controlling operation of the dressing tool 134 includes a normally closed switch 234 comprising a fixed contact member 236 and a movable contact member 238, biased to closed position, as shown. The switch is opened by the core or plunger of the solenoid 162 when the pawl 148 begins its travel.

As illustrated in FIG. 11, an arm 240, carried by the pawl 148 is arranged to engage and open the switch 234 at the beginning of the stroke of the pawl. During the stroke of the pawl 148, the solenoid 162 is pressing the dressing tool 134 against the periphery of the grinding wheel 26 to cut away the embedded metal particles. A lead line 242 connects the fixed contact member 236 to the lead line 230 and thus to the solenoid 162 and to the coil of the time delay relay 218, and the movable contact member 238 is connected by a lead 244 to the fixed relay contact 224 and by another lead 246 positive terminal of the power source.

GENERAL DESCRIPTION OF OPERATION

The following description of the wheel dressing operation starts with the assumption that the wheel 26 is free of metal particles and consequently, the meter arm 184 is at its starting or "0" voltage position, holding the switch arm 185 open, as shown in FIG. 11. As the grinding operation proceeds, some metal particles are embedded in the wheel 26 and are magnetized by the magnet 72 which causes a voltage to be generated. This voltage is sensed by the transducer 166 and is amplified by the amplifier 172 which as a consequence rotates the meter shaft 182 and the arm 184 clockwise, as viewed in FIG. 11. As the voltage increases with increase in the density of metal particles in the periphery of the grinding wheel 26, the arm 184 continues to move and allows spring 192 to close the contacts 188 and 190 which energizes the relay coil 220 with a holding E.M.F. insufficient to pull the switch member 164 closed, as previously mentioned. When the arm 184 reaches a selected point on the voltage scale 186 representative of an undesirably high density of metal particles embedded in the wheel 26, the arm closes the switch member 164 with contact 194. This causes solenoid 200 to be further energized so as to close the relay switch 202 which then completes the circuit of and energizes the solenoid 162. At the same time, the time delay relay 218 is energized and closes its contacts 222 and 224. The energized solenoid 162 actuates the pawl 148 and rotates the ratchet wheel 144 whereby to press the dressing tool 134 against the periphery of the wheel 26. The dressing tool 134 will effectively cut away the wheel until the pawl has reached the end of its stroke at which time the time delay relay 218 opens its contacts 222 and 224, whereupon to return the solenoid plunger and pawl to their home positions, closing contacts 236 and 238 to effect a second cycle of operation of the dressing tool 134. As the density of the metal particles embedded in the wheel has been reduced by the dressing tool 134, the meter arm 184 has correspondingly rotated counterclockwise toward "0" position on the scale 186, and predetermined movement thereof open the contacts of switch 164, but the control relay switch 198 is held closed by the reduced E.M.F. holding circuit until the meter arm 184 opens contacts 188 and 190. Until this occurs, the delayed closing of the relay switch 218 initiates another cycle of operation of the dressing tool 134.

DETAIL DESCRIPTION OF OPERATION

As described above, the increasing density of metal particles in the periphery of the grinding wheel 26 is sensed by the transducer 166 and the resultant amplified voltage rotates the meter arm 184 clockwise and allows the contacts 188 and 190 to engage and energize coil 200 in a holding circuit. This circuit is from the positive terminal of the power source, through lead line 210, contacts 188, 190, leads 212, 214, the resistor 216, relay coil 200 and lead 208 to the negative terminal of the power source. When the meter arm 184 approaches the high voltage end of the meter scale 186, the arm engages and closes the contacts 164, 194 to further energize the relay coil 200 to close the relay contacts 202, 204. This circuit is from the positive terminal of the power source, through the now closed contacts 188, 190, lead line 212, the now closed contacts 164, 194, lead 206, relay coil 200, and lead line 208 to the negative terminal of the power source. The closing of the relay contacts 202, 204 closes the circuit of the solenoid 162 which then moves the dressing tool 134 against the grinding wheel 26. The circuit of the solenoid 162 is from the positive terminal of the power source through the lead line 246, switch contacts 238, 236, lead lines 242, 230, 228, the coil of solenoid 162, lead 226, the now closed relay contacts 204, 202 to the negative terminal of the power source. Also, the closing of the control relay contacts 202, 204, closes a circuit to energize the coil 220 of the time delay relay 218 which circuit is as follows: From the positive terminal of the power source through the lead line 246, contacts 238, 236, lead lines 242, 230, relay coil 220, lead lines 232, 226, the now closed control relay contacts 204, 202 to the negative terminal of the power source. When the time delay switch 218 times out, its contacts 222–224 open to deenergize solenoid 162, the action in turn recloses contacts 236–238 to reenergize solenoid 162 and recycle the dressing operation. Just before the meter arm 184 returns to the "0" position of the meter scale 186, the arm 184 opens the contacts 188, 190 which breaks the holding circuit of the control relay coil 198, thus terminating the wheel dressing operation.

In order to compensate for decrease in the diameter of the grinding wheel 26 with respect to the preset position of the part size stop member 42, we provide for controlling the motor 52 by a pair of potentiometers 250 and 252 to reset the stop member 42. The potentiometer 250 is mounted with its operating arm, as at 254, affixed to the shaft 122, as shown in FIGS. 1 and 6, and is rotated along and in contact with a resistor 256, by the weight of the head 75 under control of the pressure responsive element 92. That is, the arm 254, rotates in a direction to apply voltage to the motor 52, thus to move the stop member 42 forwardly. The other potentiometer 252 has a movable contact 258 engaging a resistor 260, and as shown in FIG. 2, the contact 258 rotates with a shaft 220 which is driven by a pinion 261 in mesh with a gear rack 262, carried by the nut 54. The input circuits of the potentiometers 250 and 252 are connected in parallel with a D.C. source of voltage, by lead lines 264 and 266 and lead lines 268 and 270, as illustrated in FIG. 12. The motor is diagrammatically represented in FIG. 12 as comprising an armature 272 and a field or coil 274, the armature being connected by lead lines 276 and 278 to a source of power. Operatively connecting the motor coil 274 and the potentiometers 250 and 252 there is a pair of relays 280 and 282 respectively. One end of the coil of relay 280 is connected by a lead line 288 to the movable contact 254 of the potentiometer 250 and the other end of the coil is connected by a lead line 290 to the movable contact 258 of potentiometer 252. Similarly, the coil of relay 282 has one end connected by a lead line 292 to the movable contact 258 of the potentimeter 260 and the other end of the coil is connected by a lead line 294 to the lead line 288. In leads 290 and 294 are respectively provided rectifiers or diodes 295 and 297 to effect unidirectional current flow in the desired directions. The relay 280 has a pair of connected together movable contact members 296 and 298 cooperable respectively with fixed contact members 300 and 302 connected by lead line 304 and 306 respectively to the positive lead 308 and the negative lead 310. Similarly, a pair of connected together movable contact members 312 and 314 of the relay 282 cooperate respectively with a pair of fixed contact members 216 and 218, connected by lead lines 320 and 322 respectively to the negative lead 310 and the positive lead 308. The movable contact members 296 and 298 are connected by leads 324 and 326 respectively to opposite ends of the coil 274 of the reversible motor 52. Similarly, the movable contacts 312 and 314 are connected by leads 328 and 330 respectively to the opposite ends of the coil 274 of the reversible motor 52. The closing of contacts 296 and 298 energizes the motor 52 to operate in a direction to move the settable stop member 42 forwardly or rightward, facing FIG. 2, and the closing of the contacts 312 and 314 cause the motor 52 to operate in a reverse direction to move the settable stop member 42 rearwardly.

The operation of the control system of FIG. 12 is as follows: Assume that the grinding wheel 26 is being fed against the workpiece 25 by an attendant operating the hand wheel 38. As previously mentioned, the grinding wheel 26 wears with accompanying decrease in its diameter and also the size of the part 25 is decreasing so that for best results, the wheel must be advanced in accordance with said wear. At the start of a grinding operation, the machine attendant, by means of the knob 45 and dial 46, sets the stop member 42 at the desired part size setting. The attendant then by means of the hand wheel 38 advances the grinding wheel 26 to engage the part 25. Also at the start of the grinding operation, it will be understood that the potentiometer contacts 254 and 258 will be in like positions with respect to their resistors 260 and 256, the consequencse of which is that no voltage is applied to the coils 284 and 286 of the polarized relay 280. This, of course, means that both sets of the relay contacts 296, 298 and 312, 314 are open and the motor 52 is at rest. As the machine attendant continues to advance the grinding wheel 26 against the workpiece 25, the diameter of the grinding wheel decreases by wear, as previously mentioned, and the head 75 moves downward correspondingly, under the control of the pressure responsive piston 92 of FIGS. 4 and 9. As the head 75 moves downward, the gear rack 128 carried thereby in mesh with gear 126 rotates the shaft 122 and thus rotates the rheostat arm 118 and the potentiometer arm or contact 254. As previously mentioned, operation of the rheostat by descent of the head 75 correspondingly increases the voltage to the grinding wheel drive motor so as to maintain the surface speed of the wheel 26 substantially constant irrespective of wheel wear. When the potentiometer arm 254 has been rotated along its resistor 256 to a point where the voltages applied to the coils of the relays are unbalanced by a predetermined voltage differential, the contacts 296 and 298 are closed to start the motor 52 which then operates to reset the stop member 42 in compensation for the wear of the grinding wheel 26. The circuit of the relay coil 280 is from the positive lead 264 through the potentimeter resistor 250, contact 254, lead 288, the coil of the relay 280, lead 290, diode 295, potentiometer contact 258, resistor 260, and leads 270 to the negative lead 266. It will thus be seen that the differential voltage between the coils of the relays 280 and 282 is a function of grinding wheel wear and activates the motor 52 to reset the stop member 42 accordingly. When the motor is energized to reset the stop member 42, the gear rack 262, shown in FIG. 2, is moved forwardly to rotate the gear 260 and thus the arm 258 of the second or follower potentiometer 252. The potentiometer arm 258 rotates in a direction to increase voltage to the coil of the relay 282 and thus decrease the voltage differential between the relay coils. When the voltage differential becomes zero, the contacts 296 and 298 open to stop the motor 52. When the lead or potentiometer 250 is moved by head 75 following wear of wheel 26, a positive voltage is produced through rectifier 297, energizes coil 286, closes relay contacts 216 and 218, and through leads 328 and 330 drives motor 52. Motor 52 through gear reducer 50, turns screw 48 which advances nut 54, gear rack 26 and gear 260 and its shaft 220, and contact arm 258 clockwise until it reaches equal resistance with potentiometer 254 at which time no voltage will be applied to relay coils 280, which will be open. Its contact and motor 52 will be deenergized.

This action, besides bringing the two potentiometers 254 and 258 in equal balance has advanced nut 54 and stop screw 40 and its stop end 42, forward, to compensate for a decrease in diameter of wheel 26, either by wear or dressing.

When a new wheel 26 is mounted, head 75, must be moved in the reverse direction which will cause reverse action in coil 284 of the relay, will be energized and motor 52 will reverse the direction of screw 48, nut 54, adjusting screw 40 and it's stop end 42. Also gear rack 262 will now turn potentiometer 252 in a counterclockwise rotation until it is again in balance with the new position of lead potentiometer 250.

It can be seen that the only time the operator has to make any adjustment for part size is on the original set-up. The automatic size control as described, performs this function automatically until a new part size is desired at which time the operator adjusts knob 45 and its dial 46 for the new size.

Referring now to FIG. 14, there is shown a modification of the grinder which, instead of an abrasive wheel, has an endless abrasive belt 334 driven and guided about a pair of drums 336 and 338. A suitable mounting member 340 adjacent one side of the belt 334 is provided to support a workpiece 342 which is illustrated as being in engagement with the belt. Spaced along the belt 334 from the workpiece 342 there is another mounting 344 on which is mounted a permanent magnet 346. The magnet 346 is preferably a magnet arranged with its poles proximate the path of travel of the belt 334 so as to attract and remove loose metal particles from the belt and thus increase its useful life.

Figure 15:
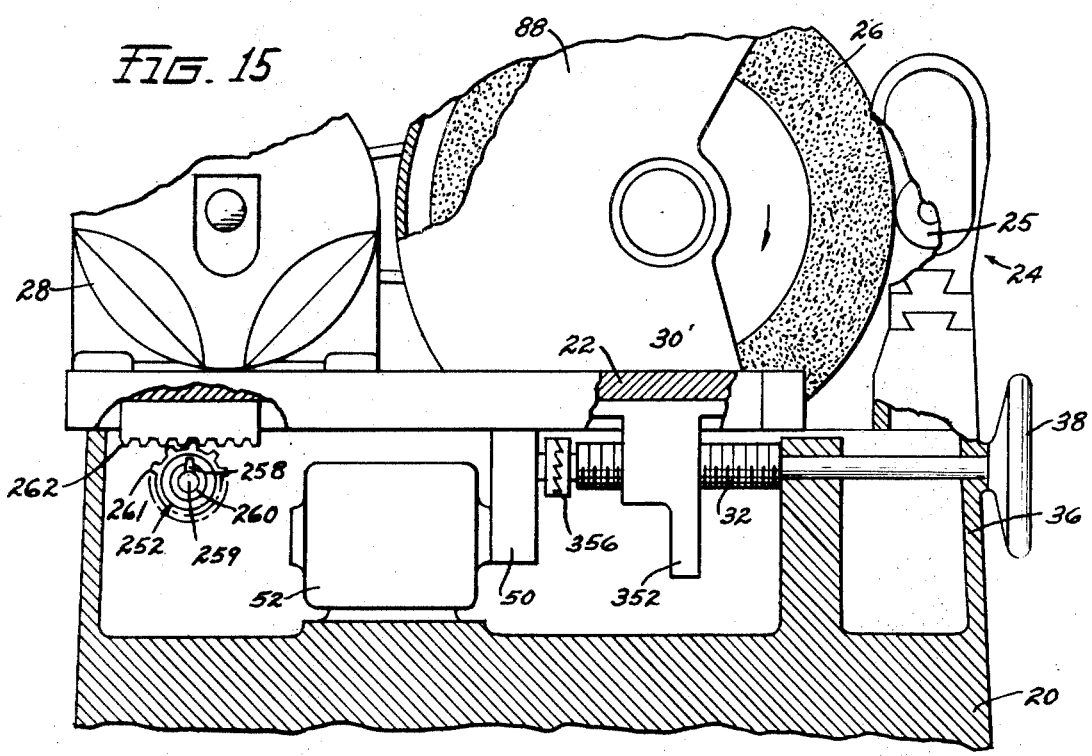
FIG. 15 is a view similar to FIG. 2, showing a modification of workpiece size control mechanism.

In FIG. 15 there is shown a modification of the part size control mechanism of FIG. 2, and like parts have been designated by like numerals to avoid unnecessary repetitious description. In the modification of FIG. 15, the feed member or screw 32 is driven by the motor 52 through the speed reduction mechaninsm 50' to feed the abrasive wheel 26 against the workpiece 25. Preparator to the grinding of the workpiece 25, the machine attendant, by means of the hand wheel 38 advances the abrasive wheel 26 until it is tight against a finished size workpiece 25, as shown in FIG. 15. The operator then turns potentiometer contact 258 by a knob 259 until the potentiometers 252 and 250 are in phase and switch members 296 and 298 are open and consequently motor 52 is at rest or deenergized.

By means of the hand wheel 38, the machine operator moves the grinding wheel 26 away from the workpiece 25. During this time, the unidirectional clutch 356, connecting the speed reduction mechanism 50' to the motor 52, will be turning in a direction to feed the grinding wheel 26 into the workpiece, but cannot do so until the operator stops turning it back.

With a new unground piece in place, the motor 52 through the speed reducer 50 drives the unidirectional clutch 356 and screw 32, hand wheel 38 forwardly until potentiometer 252 is in phase with potentiometer 250 at which time switch members 296 and 298 will open, stop advance of the grinding wheel 26 and part 25 will be ground to size. Wheel wear will be compensated for as previously described in connection with the workpiece size control mechanism of FIG. 2. From the above description it will now be understood that the movable contact arm 258 functions as a settable stop member for stopping the motor 52, and determines the finished size to which the workpiece is ground.

Figure 16:
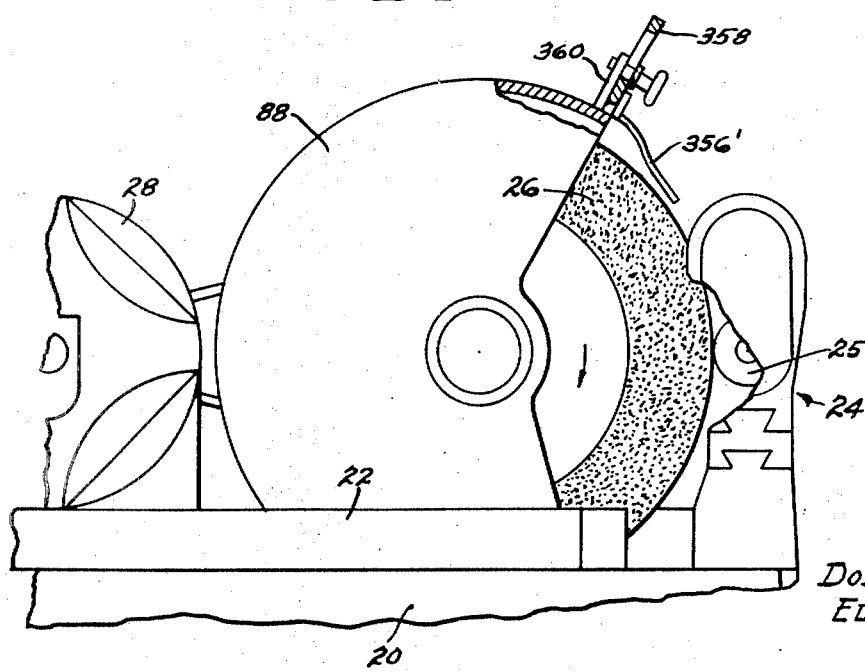
FIG. 16 is a fragmentary side view partly in section of a grinding machine embodying a modification of a magnet mounting.

In FIG. 16 there is shown a modification of the mounting of a magnet in overlying relation to the periphery of the grinding wheel 26. In this modification, flexible rubber strips 356' are attached at ends thereof to a tongue 358 which is adjustable and is clamped to a bracket 360 overlying the wheel periphery. The rubber strips 356' are impregnated with magnetized ferrite, exposed on the undersides of the strips toward the wheel periphery to attract and remove loose metal particles from the wheel. The strips 356' are adjusted such that the air stream caused by the rotating grinding wheel holds the strips slightly away from the wheel periphery, as illustrated in FIG. 16.

While we have shown and described our invention in considerable detail, it will be understood that many variations and changes may be made without departing from the spirit and scope of the invention.

What is claimed is:

1. In abrading apparatus, supporting means, a driven abrasive wheel mounted on said supporting means to grind a metal workpiece, a magnet mounted with its poles proximate the periphery of said wheel to magnetize metal particles embedded in said wheel, a transducer element mounted proximate the periphery of said wheel to generate a voltage increasing with increasing density of magnetic metal particles in the periphery of said wheel, and a meter connected to said transducer and driven by the transducer generated voltage to indicate the density o fmetal particles embedded in said wheel.

2. In abrading apparatus, supporting means, a driven abrasive wheel mounted on said supporting means to grind a metal workpiece, a magnet mounted with its poles proximate the periphery of said wheel to magnetize metal particles ground from the workpiece and embedded in the periphery of said wheel, a transducer element mounted in close proximity to the periphery of said wheel and operable to generate a voltage increasing with increasing density of magnetized metal particles embedded in said wheel, a power element operable to move a dressing tool into engagement with the periphery of said wheel to cut away the metal particles, and a control member operatively connected to said transducer and to said power element to activate the latter in response to a predetermined increase in voltage at said transducer.

3. In abrading apparatus as defined by claim 1 wherein said control member is operated by a rotatable arm of a volt meter connected electrically to said transducer.

4. In abrading apparatus for abrading a workpiece, a rotatably driven grinding wheel, a first safety guard member extending partway around the periphery of said wheel in spaced relationship to the wheel periphery, said wheel decreasing in diameter by wear, a movably mounted second safety guard member overlying the periphery of said wheel between the wheel periphery and said first guard member, said second guard member biased to move toward the periphery of said wheel, a conductor to conduct fluid under pressure and having an outlet to direct a stream of the fluid under pressure against the periphery of said wheel, and a movable member connected to said second guard member and responsive to decrease in the force of said stream against said wheel periphery to maintain said second guard member at a predetermined substantially constant distance from the periphery of said wheel.

5. In abrading apparatus for abrading a magnetic metal workpiece, supporting means, a driven grinding wheel mounted on said supporting means, a magnet mounted proximate the periphery of said grinding wheel to extract metal particles therefrom, said magnet mounted for movement toward the periphery of said grinding wheel, means supporting said magnet and responsive to decrease in the diameter of said wheel to maintain said magnet at a substantially constant magnetically effective distance from the periphery of said grinding wheel as the diameter of the latter decreases by wear, said magnet supporting means comprising a pressure regulated fluid conducting system having a pressure responsive element operatively connected to said magnet for movement together and having a fluid outlet directed at the periphery of said grinding wheel.

6. In abrading apparatus, a driven grinding wheel, a body having a surface overlying and mounted for movement toward the periphery of said grinding wheel, said grinding wheel decreasing in diameter by wear, a source of fluid under regulated pressure having an outlet directed at the periphery of said grinding wheel to effect a predetermined constant fluid back pressure when the periphery of said grinding wheel is a predetermined distance from said surface of said body, and a pressure responsive element in communication with said back pressure and operatively connected for movement with said body to maintain the distance between said surface and the periphery of said grinding wheel substantially constant irrespective of decrease in the diameter of said grinding wheel.

7. In abrading apparatus as defined by claim 6 wherein said pressure responsive element is a fluid pressure counterbalance.

8. In abrading apparatus as defined by claim 6 with the addition of a magnet carried by said body proximate the grinding surface of said grinding wheel to extract metal particles loosely clinging to said grinding wheel.

9. In an abrading apparatus as defined by claim 8 wherein said magnet also establishes a magnetic field with metal particles ironed into pores of said grinding wheel by the grinding operation, and the addition of a transducer element carried by said body proximate said grinding wheel and responsive to the magnetic field to generate a voltage indicative of the density of metal particles in said grinding wheel.

10. In abrading apparatus, supporting means, a driven abrading tool mounted on said supporting means and operable to abrade particles from a workpiece having magnetic properties, some of the metal particles being ironed by the abrading operation into the pores of said abrading tool with increasing density and accompanying decrease in efficiency of said abrading tool, means to magnetize the metal particles on said abrading tool, the intensity of the magnetic field increasing with increase in density of metal particles on said abrading tool, and an indicator responsive to a predetermined increase in the intensity of the magnetic field as an indication of decreased efficiency of said abrading tool.

11. In abrading apparatus as defined by claim 10 wherein said magnetizing means is a magnet overlying and proximate said abrading tool.

12. In an abrading apparatus as defined by claim 10 wherein said indicator is a switch member.

13. In an abrading apparatus as defined by claim 11 with the addition of a magnetic transducer element responsive to the magnetic field and operatively connected to said switch member.

14. In an abrading apparatus as defined by claim 12 with the addition of a dressing tool operable to engage and dress said abrading tool and operatively connected to and controlled by said switch member.

References Cited

UNITED STATES PATENTS

| | | | |
|---|---|---|---|
| 2,423,287 | 7/1947 | Beisel | 51—9 |
| 2,549,529 | 4/1951 | Sandlin | 51—270 |
| 2,751,729 | 6/1956 | Christiansen | 51—262 |
| 2,831,297 | 4/1958 | Skran | 51—349 X |
| 2,938,590 | 5/1960 | Barnett | 180—125 |

ROBERT C. RIORDON, Primary Examiner

D. G. KELLY, Assistant Examiner

U.S. Cl. X.R.

51—72, 269